United States Patent [19]

Bauer

[11] 4,157,161
[45] Jun. 5, 1979

[54] WINDSHIELD WASHER

[75] Inventor: Peter Bauer, Germantown, Md.

[73] Assignee: Bowles Fluidics Corporation, Silver Spring, Md.

[21] Appl. No.: 618,252

[22] Filed: Sep. 30, 1975

[51] Int. Cl.² ............................................. B05B 1/08
[52] U.S. Cl. .................................... 239/11; 137/830; 137/835; 239/284 R
[58] Field of Search .................. 239/102, 229, 284 R, 239/4, 11; 137/829, 830, 835

[56] References Cited

U.S. PATENT DOCUMENTS

| | | | |
|---|---|---|---|
| 2,417,222 | 3/1947 | Stine | 239/229 |
| 2,758,874 | 8/1956 | Snyder | 239/229 |
| 3,213,493 | 10/1965 | Chichester | 239/284 X |
| 3,423,026 | 1/1969 | Carpenter | 239/284 |
| 3,432,102 | 3/1969 | Turner et al. | 138/835 X |
| 3,507,275 | 4/1970 | Walker | 128/DIG. 10 |
| 3,552,415 | 1/1971 | Small | 137/835 |
| 3,563,462 | 2/1971 | Bauer | 137/835 X |
| 3,754,576 | 8/1973 | Zetterström et al. | 137/829 |
| 3,979,068 | 9/1976 | Applebaum | 239/284 R |

FOREIGN PATENT DOCUMENTS 1655022  3/1971 Fed. Rep. of Germany.

Primary Examiner—Richard A. Bertsch
Assistant Examiner—Michael Mar
Attorney, Agent, or Firm—Rose & Edell

[57] ABSTRACT

A windshield washer comprises a nozzle in which a liquid jet is formed and repetitively transversely swept before egressing from the nozzle body. The swept jet breaks up into liquid droplets which impinge upon a wide area of a windshield. In a preferred embodiment the nozzle is an oscillator, preferably a fluidic oscillator, in which the jet is swept oscillatorily between two extreme positions. In still another form of the invention discrete slugs of liquid are alternately issued in at least two directions from a common nozzle body.

24 Claims, 8 Drawing Figures

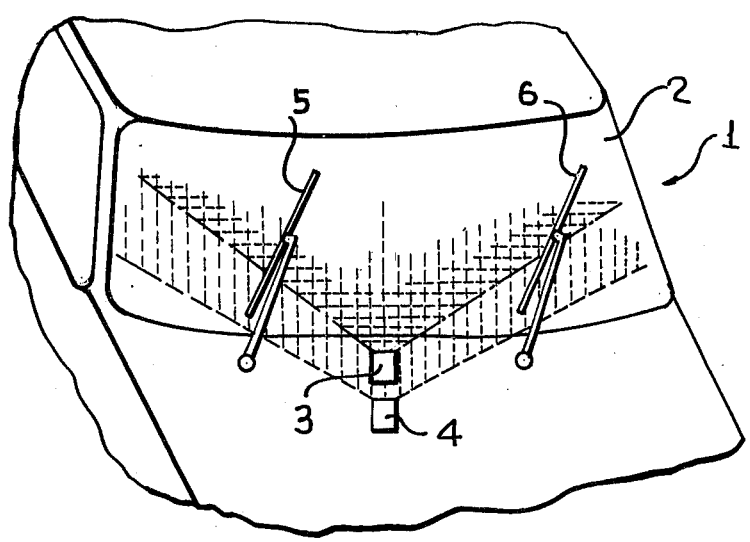
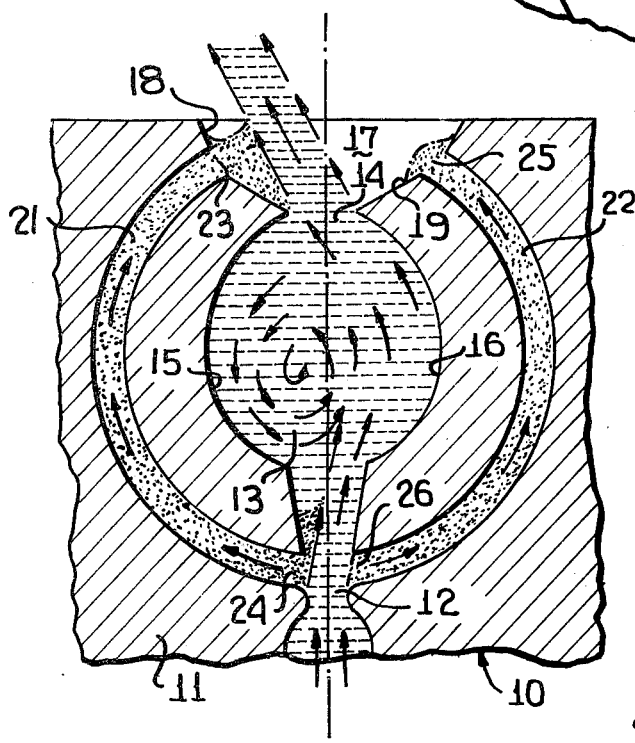
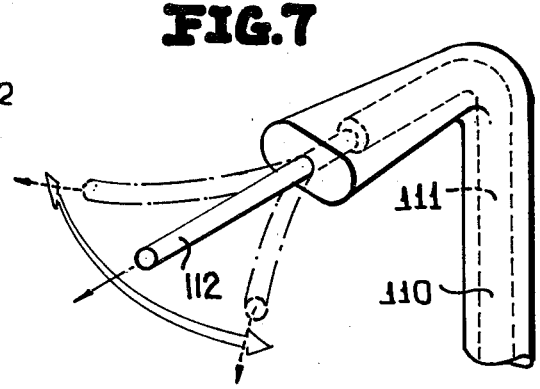
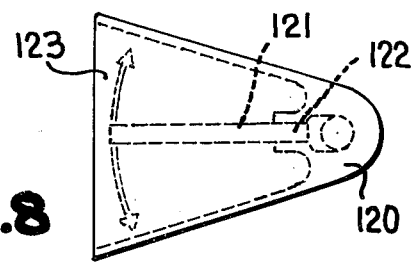
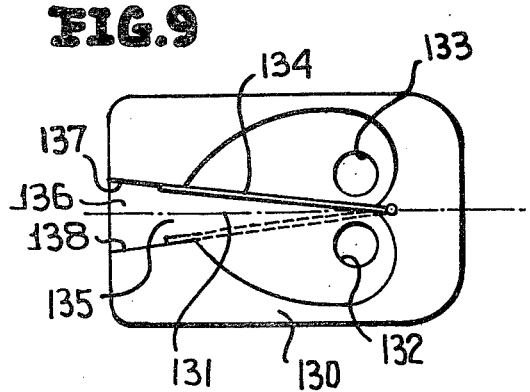
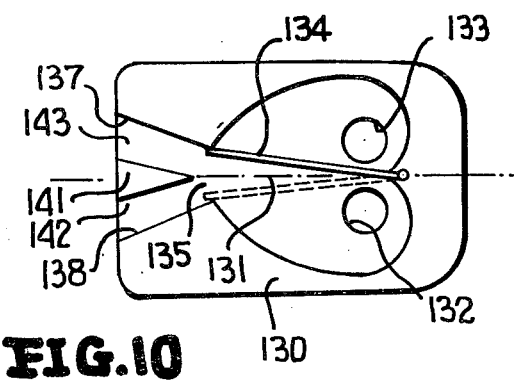

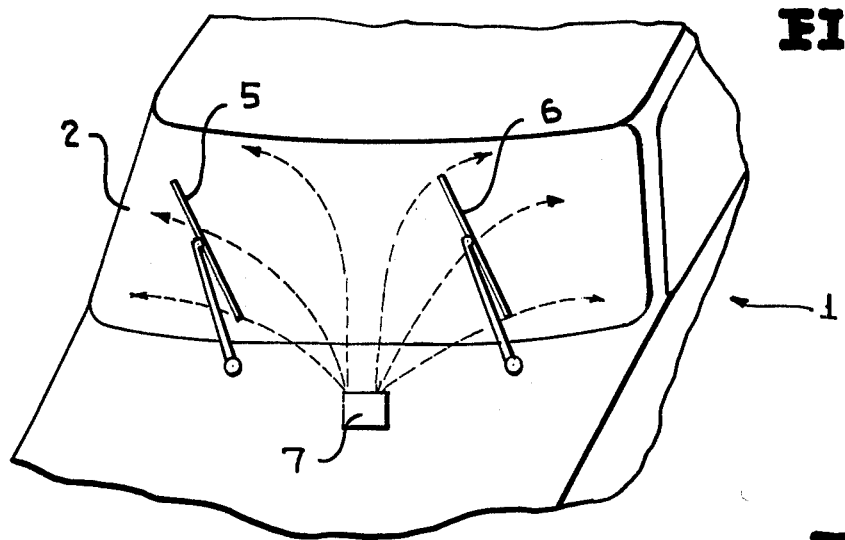
FIG.5
FIG.6
FIG.3
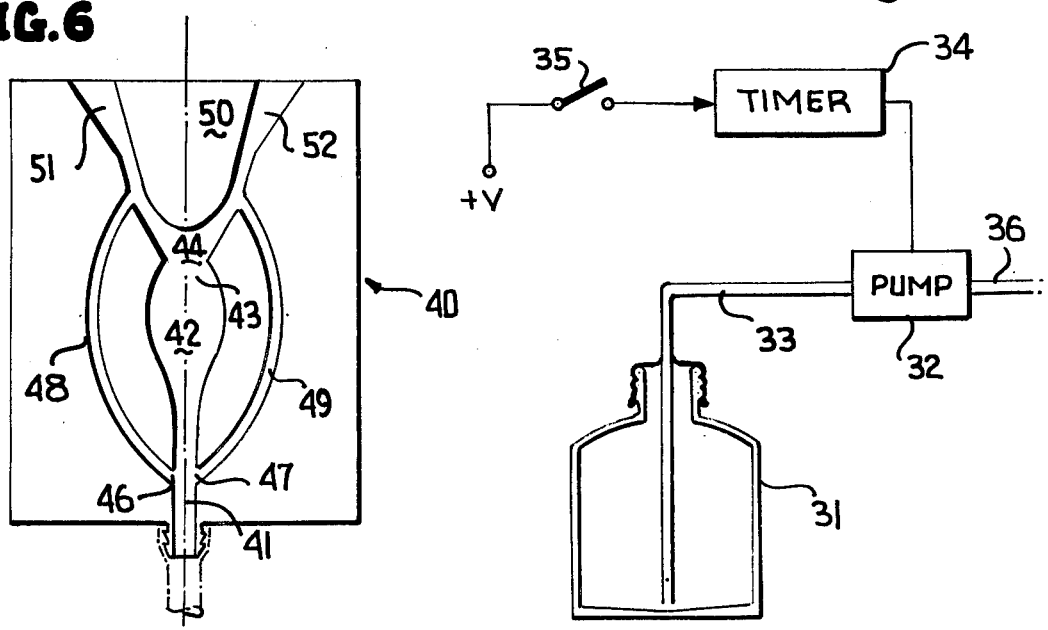
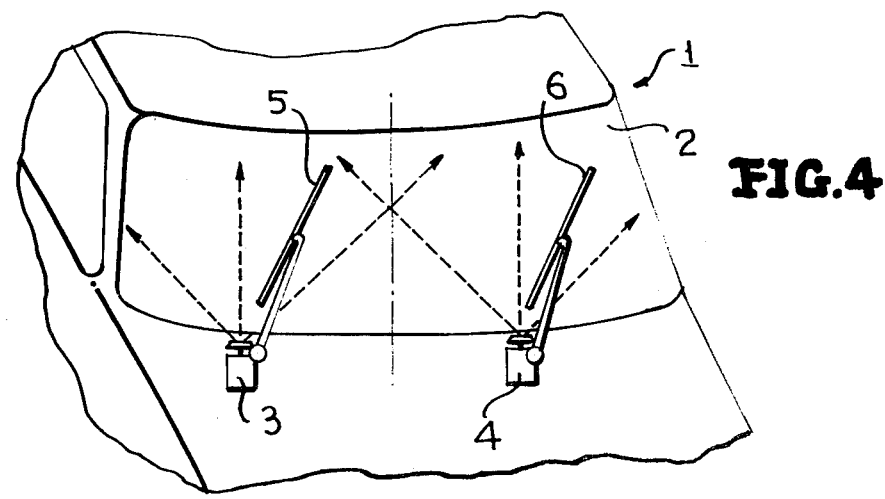
FIG.4

WINDSHIELD WASHER

BACKGROUND OF THE INVENTION

The present invention relates to improvements in windshield washer nozzles which, in conjunction with wiper blades, function to clean vehicle windshields or similar window units.

Windshield washers presently used in motor vehicles and the like employ two nozzles, one for each side of the windshield. The nozzles are fed liquid under pressure from a reservoir via some type of pumping arrangement which is operator-initiated for a predetermined time period or until a predetermined volume of liquid is pumped.

Disadvantages of the aforementioned existing system include: the need for two or more nozzles and the appropriate liquid conduits in order to cover both sides of a windshield; the localized area against which the issued jet strikes the windshield, requiring many strokes of the wiper blade, and possibly many actuations of the washer, before mud, salt spray, or similar dirt can be cleared away sufficiently to afford the desired visibility; wear and tear on wiper blades which, because of the localized impact area of the washer spray, are forced to wipe large sections of dry windshield until the wash liquid is sufficiently distributed by the wiper; and the running of the wash liquid downward, for low vehicle speed, and upward, for high vehicle speeds, and out of the wiper blade range before it can be distributed by the wiper blade, thereby wasting considerable amounts of wash liquid.

It is therefore an object of the present invention to provide a method and apparatus for washing windshields in which a common nozzle may be utilized to obtain full spray coverage of the windshield.

It is another object of the present invention to provide a method and apparatus for washing windshields wherein the wash liquid is so distributed that a single stroke of the blade will provide full visibility for most windshield dirt conditions.

It is another object of the present invention to minimize wear and tear of windshield wiper blades by issuing wash liquid over the entire path of the blade rather than relying on the blade to distribute the wash liquid.

It is still another object of the present invention to distribute windshield wash liquid by means of a nozzle in such a manner as to preclude run-off of the liquid before it can be swept by the wiper blade.

SUMMARY OF THE INVENTION

In accordance with one aspect of the present invention a windshield washer nozzle is arranged to define a liquid jet and sweep that jet repetitively in a dimension transverse to jet flow. The swept jet, upon being issued from the nozzle, breaks up into droplets which impinge upon the windshield over an area defined by the jet sweep path. One or more of such nozzles may be used to cover the entire windshield. In a preferred embodiment the jet is oscillatorily swept back and forth between two extreme positions. More preferably, the nozzle is a fluidic oscillator, although nonfluidic oscillators may be used.

In accordance with another aspect of the invention a single fluidic oscillator, having two discrete outlet passages from which a liquid jet is alternately issued, replaces the two nozzle arrangement conventionally employed to wet both sides of a windshield.

BRIEF DESCRIPTION OF DRAWINGS

The above and still further objects, features and advantages of the present invention will become apparent upon consideration of the following detailed description of one specific embodiment thereof, especially when taken in conjunction with the accompanying drawings, wherein:

FIG. 1 is a view in perspective of a motor vehicle windshield and spray apparatus according to the present invention;

FIG. 2 is a partially diagrammatic plan view of a fluid oscillator suitable for use as a spray apparatus according to the present invention;

FIG. 3 is a schematic diagram of a conventional windshield washer actuator and supply arrangement;

FIG. 4 is a view in perspective of a motor vehicle windshield and spray apparatus in which the spray is arranged to emanate from different locations than in FIG. 1;

FIG. 5 is a view in perspective of a motor vehicle apparatus and a different type of spray apparatus from that used in FIG. 1, also in accordance with the present invention;

FIG. 6 is a plan view of one type of fluidic oscillator suitable for use in the embodiment of FIG. 5;

FIGS. 7 and 8 are views in perspective and plan, respectively, of a spray apparatus suitable for use in the embodiment of FIGS. 1 and 4;

FIG. 9 is a view in plan of another spray apparatus suitable for use in the embodiments of FIGS. 1 and 4; and FIG. 10 is a view in plan of another spray apparatus suitable for use in the embodiment of FIG. 5.

DESCRIPTION OF PREFERRED EMBODIMENT

Referring specifically to FIG. 1 of the accompanying drawings, a motor vehicle 1 has a windwhield 2 which is to be selectively sprayed with liquid in accordance with the present invention. Spray emanates from a spray nozzle 3 disposed generally on the longitudinal center line of the vehicle so that the nozzle is substantially centered with respect to the windshield. In any of a number of ways to be subsequently described, nozzle 3 issues a jet of wash liquid which, within nozzle 3, is caused to repetitively sweep across windshield 2. The spray pattern, which is generally fan-shaped, is preferably wide enough to extend across the wiping ranges of both windwhield wipers 5 and 6. The repetitive jet sweep may be of the oscillatory or back and forth type wherein the jet sweeps first in one direction and then in the opposite direction between two extreme angular positions. Alternatively the jet sweep may be unidirectional, going from left to right or right to left but not in both directions.

Supplying wash liquid to nozzle 3 is accomplished in a conventional manner as described subsequently in relation to FIG. 3. It is important to note that the single nozzle 3 with its repetitive sweeping characteristic is able to wet an area extending substantially across the entire windshield 2; whereas two conventional windshield washer nozzles are required to achieve this feature. Moreover, by wetting substantially the entire area to be wiped, rather than only the localized areas wetted by conventional windshield washer nozzles, nozzle 3 eliminates the need for the wiper to bear the burden of distributing the liquid. The wiper, therefore, does not have to wipe across dry areas of the windshield. In addition, the sweeping jet breaks up into individual droplets which strike windshield 2 whereas conventional nozzles issue jets which form solid streams or puddle-like regions that distort the driver's view. Further, by quickly wetting the large area to be wiped, the swept jet nozzle 3 permits quick removal of mud, salt, and general road spray upon a single wipe of the wiper blades whereas many more wipes are required to spread the liquid issued from conventional nozzles.

For some vehicles, particularly where the top-to-bottom dimension of the windshield is quite long, it may be desirable to use a second swept jet nozzle, such as nozzle 4 in FIG. 1. Nozzle 4 is also disposed centrally relative to windwhield 2 and is arranged so that its issued jet strikes the windshield at a higher location than the jet from nozzle 3. It is to be stressed that the second nozzle 4 is optional and would not be required for the vast majority of automobiles presently being sold.

Referring specifically to FIG. 2 of the accompanying drawings, a fluidic oscillator 10, suitable for use as spray nozzle 3 or 4, is illustrated in the form of various flow channels and passages. Oscillator 10 is of the type described in FIGS. 1–3 of co-pending U.S. patent application Ser. No. 510,722, filed Sept. 30, 1974, and entitled "IMPROVEMENTS IN CONTROLLED FLUID DISPERSAL TECHNIQUES". As is conventional in fluidics technology, the channels are preferably defined at one surface of a base plate 11, which surface is then sealed by a cover plate (not shown). Alternatively, plate 11 may be a center plate sandwiched between top and bottom cover plates. A tapered or convergent power nozzle 12 is adapted to receive pressurized wash liquid and issue a liquid jet into the upstream end of an interaction region 13. The interaction region is defined between left and right sidewalls 15 and 16, respectively, which first diverge from power nozzle 12 and then converge toward an outlet throat 14 located at the downstream end of the region. Nozzle 12 and throat 14 are disposed in substantial alignment with one another along the longitudinal centerline of oscillator 10. An outlet region 17 is located immediately downstream of throat 14 and is defined between left and right outlet walls 18 and 19, respectively, which diverge in a downstream direction from throat 14. A left control passage 21 extends between outlet region 17 and the upstream end of interaction region 13 through port 23 defined in left outlet wall 18 and port 24 defined in left sidewall 15. A similar right control passage 22 extends between outlet region 17 and the upstream end of interaction region 13 through port 25 in right outlet wall 19 and port 26 defined in right sidewall 16. The upstream sides of ports 24 and 26 terminate at the outlet of power nozzle 12; the upstream sides of these ports are set back from the oscillator centerline relative to the upstream sides.

As is typical with fluidic oscillators, during operation of oscillator 10 a power jet of fluid issued from nozzle 12 is cyclically deflected between extreme positions defined by sidewalls 15 and 16. The phenomena producing oscillation is described subsequently; for the present, it should be noted that, when flowing along left sidewall 15, the jet is guided back to the right thereby and egresses through throat 14 in a direction generally toward right outlet wall 19. When flowing along right sidewall 16 the jet is guided back to the left thereby and egresses through throat 14 in a direction generally toward outlet wall 18. Intermediate the two extreme positions the jet sweeps across outlet region 17. Operation of this particular oscillator, in contradistinction to prior oscillators, is characterized by the fact that neither working fluid from the power jet nor ambient fluid is ingested back into interaction region 13 through control passages 21 and 22. Instead, when the jet flows along left sidewall 15 towards right outlet wall 19, it entrains and merges with outflow through right control passage 22; meanwhile, left control passage remains filled with fluid derived from the upstream end of interaction region 13.

The absence of inflow or ingestion from outlet region 17 is achieved by creating a static pressure at the upstream end of interaction region 13 which is higher than the static pressure in outlet region 17. This pressure difference is created by a combination of factors, including: the width T of throat 14 which is only slightly wider than power nozzle 12 so that the egressing power jet fully seals interaction region 13 from outlet region 17; and the length D of interaction region 13 from power nozzle 12 to throat 14, which length is significantly shorter than in prior art oscillators. It should be noted that the width X of control passages 21, 22 is smaller than the power nozzle. In referring to the widths T and X, it is assumed that the depth H of the various channels in the oscillator is constant throughout. If such is not the case, the cross-sectional areas of throat 14 and passages 21, 22 are to be considered. If all channels in oscillator 10 are of equal depth (i.e. into the plane of the drawing), and if the width of power nozzle 12 at its narrowest point is W, then the following relationships are suitable, although not necessarily exclusive, for operation in the manner described hereinbelow:

$T = 1.0W$ to $1.7W$ $D = 4W$ to $9W$

Considerable leeway in these dimensions exists, depending to some extent upon other dimensions such as the setback B between the downstream ends of sidewalls 15 and 16, the transverse width of interaction region 13, and the width of openings 24, 26.

The oscillator frequency depends upon the size of the oscillator and other factors. Generally, the frequency f may be represented by: $f = 54.4 \sqrt{p}$; or $f = 1700 Q$ where p is the liquid pressure applied to the oscillator and Q is flow through the unit.

The absence of inflow to interaction region 13 during oscillator operation is particularly important. For one thing, as the liquid jet approaches the outlet wall, for example left outlet wall 18, it induces and merges with liquid outflow from left control passage 21. This merger of power jet liquid with control liquid prevents the power jet from impinging directly against outlet wall 18; that is, the outflow from the control passages 21, 22 provides a sort of cushioning effect for the deflecting jet. Consequently, the edges of the jet do not experience the shearing effect which would result from its impinging against the outlet wall. Minimization of the shearing effect in turn minimizes the formation of extremely small or fine droplets at the stream boundary, which droplet tends to be blown away and not strike the windshield of a moving vehicle. In addition, outflow through control passages 21, 22 ensures against ingestion of jet liquid or ambient fluid into the interaction region. In most prior art fluidic oscillators, the very operation of the oscillator depends upon inflow of jet or ambient fluid in the interaction region via such control or feedback passages. Such inflow is undesirable since it may contain dirt which can clog the oscillator. Oscillator 10, on the other hand, eliminates this problem.

The operation of oscillator 10 may be described as follows, with reference to FIG. 2. Assume initially that liquid under pressure is applied to power nozzle 12. The liquid jet which is issued by power nozzle 12 is initially directed straight through interaction region 13 and egresses through throat 14. The narrowness of throat 14 results in portions of the jet periphery being scooped off and recirculated along sidewalls 15 and 16 to form vortices on the sides of the jet in interaction region 13. Due to slight inherent perturbations in the jet, the vortex on one side becomes stronger than that on the other and therefore tends to deflect the jet to flow along one of the sidewalls (e.g. right sidewall 16 as illustrated in FIG. 2). The remaining vortex further increases the pressure in interaction region 13 which is effectively sealed from outlet region 17 by the egressing power jet. The liquid fills the interaction region and the static pressure therein builds up to a higher level than that in outlet region 17, whereupon liquid begins to flow from the interaction region into control passages 21, 22. Meanwhile, the power jet is directed by right sidewall 16 to flow generally toward left outlet wall 18. Liquid outflow through left control passage 21 is aided by jet aspiration and merges with the jet at left outlet wall 18, preventing the jet from impinging against the wall itself. The jet tends to increase the flow rate of liquid through control passage 21 when in the position shown in FIG. 2 because of the aspiration effect the jet has on the left control passage as it flows along left outlet wall 18. This aspiration tends to reduce the pressure in left control passage 21 relative to that in right control passage 22 which is filled with liquid and in which no similar aspiration occurs at this time. The pressure differential in the control passages is reflected at the upstream end of the interaction region and causes the jet to be deflected across the interaction region so at to flow along left sidewall 15 and toward right outlet wall 19. During such deflection the jet sweeps from left to right across the outlet region 17. Upon approaching right outlet wall 18 the jet begins to aspirate liquid from right control passage 22 and ceases aspiration through left control passage 21. The pressure on the right side of the power stream is therefore rendered lower than on the left side and the jet is deflected once again. This cyclic deflection of the jet results in a cyclic sweeping back and forth of the jet across outlet region 17.

I have found that the flow conditions in the unaspirated control passage (e.g.—right control passage 22 when the jet is directed along left outlet wall 18; left control passage 21 when the jet is directed along right outlet wall 19) are dependent upon the pressure of the liquid applied to power nozzle 12. Specifically, for low and intermediate pressures the liquid in the unaspirated passage tends to form a convex meniscus which bulges outwardly from opening 25 or 23 into the outlet region as illustrated in FIG. 2 for opening 25. At high applied pressures the meniscus becomes concave, as illustrated in FIG. 3 for opening 25. In all cases, however, the unaspirated passage remains full of liquid and prevents any flow back into interaction region 13. Therefore, over an entire cycle, there is a net flow outwardly (i.e. to the outlet region) from both control passages 21, 22.

The relative shortness of interaction region 13 is particularly interesting in view of the fact that in prior art oscillators short interaction regions render the power jet incapable of oscillation or even significant deflection. The power jet in the present invention not only oscillates within a short interaction region, but does so at a frequency which varies in direct proportion to the flow rate through the oscillator.

The build-up of a higher pressure at the upstream end of interaction region 13 relative to outlet region 17 is likewise antithetical to the teachings regarding prior art fluidic oscillators. Specifically, most prior art oscillators require feedback flow toward the interaction region to achieve deflection of the power jet; such feedback flow requires a low pressure at the upstream end of the interaction region. Moreover, too high a pressure in the interaction region has heretofore been thought to impede jet deflection. In the present invention, however, high frequency oscillation readily occurs. In addition, it is this pressure build-up which causes flow to be directed outward through the control passages, a crucial aspect of oscillator 10.

Depending upon the dimensions of the various parts of the oscillator, it is capable of delivering a variety of liquid spray patterns. Specifically, as the power jet sweeps back and forth it breaks up into droplets of generally uniform size, which size depends upon a number of factors including the size of the oscillator, frequency of oscillation, etc. These droplets are distributed in a spray pattern having a more or less fan configuration, the sides of which are defined by the angle between the outlet walls 18, 19 of the oscillator. Distribution of the droplets within the spray pattern depends upon the oscillator dimensions, primarily on the width of throat 14.

Referring to FIG. 3 of the accompanying drawings, there is illustrated a schematic diagram of the liquid supply and actuator for the sprayer illustrated in FIGS. 1 and 2. It should be noted that the arrangement of FIG. 3 is conventional and typical of just one of numerous types of arrangements which serve the same function. A reservoir 31 of wash liquid is arranged to have liquid pumped therefrom by means of a pump 32 acting via flow tube 33. The pumped liquid is supplied via tube 36 to sprayer 3 or 4 of FIG. 1, specifically at nozzle 12 of FIG. 2. The pump 32 is actuated by an operator-controlled switch 35 which first initiates a time cycle at timer 34. For the predetermined timer period, which may typically be one to five seconds, the pump is rendered operative to draw wash liquid from reservoir 31 and deliver it to the sprayer.

The arrangement of FIG. 3 may be used in conjunction with all of the sprayer embodiments described herein.

Referring to FIG. 4, for some applications, particularly for vehicles with extra-wide windshields, it may be desirable to locate sprayers 3, 4 on either side of the longitudinal center line of the vehicle, much like the locations of conventional windshield sprayers. This arrangement, of course, loses the economy of requiring only one sprayer but still is advantageous in that it more quickly wets the wiped area with less loss of wash liquid than do conventional sprayers.

In another aspect of the present invention, a single fluid oscillator may be employed to deliver two alternating non-sweeping jets to respective sides of a windshield. This arrangement is illustrated in FIG. 5 wherein a vehicle 1 with a windshield 2 has a sprayer 7 mounted substantially centrally of the windshield. Sprayer 7, examples of which are described in detail below, characteristically delivers slugs of liquid from two outlet passages in alternation. These passages are oriented so that one issues its slugs onto the left side of windshield 2 and the other issues its slugs onto the right side of windshield 2. Numerous types of fluid oscillators operate in this manner, some of which are fluidic (i.e. no moving parts are required to oscillate the jet back and forth between outlet passages). A particularly advantageous fluidic oscillator is the one described in my U.S. Pat. No. RE 27,938 which is illustrated in FIG. 6 herein.

Referring specifically to FIG. 6, the oscillator is generally designated by the reference numeral 40 and includes a power nozzle 41 which directs a liquid jet into an interaction region 42 and thence through an intially diverging and then converging region which terminates in a throat 43 that opens into a diverging outlet region 44. The oscillator is provided with a pair of control nozzles 46 and 47 connected via feedback passages 48 and 49 to outlet region 44. A flow divider 50 is disposed in outlet region 44 to define left and right outlet passages 51 and 52, respectively, between the divider and the diverging walls of the outlet region.

In operation, the jet issued by the power nozzle 41 is initially directed centrally of the interaction region 42 and fills the region with a mixture of fluid, fluid spray, and entrained air bubbles, whilst some fluid passes into outlet region 44 and exists via outlet passages 51 and 52. The jet quickly tends to become biased toward one side of region 43 due to random jet perturbations. The biased fluid mixture flow tends to follow, for instance, the left wall of region 42, and is injected into region 44 toward the right outlet passage 52. The fluid flow passing by the control nozzles 46 and 47 in region 42 strongly aspirates fluid from these control nozzles and from the connected feedback channels 48 and 49. The biased fluid mixture flow injected into right outlet passage 52 is aspirated into the feedback channel 49 and flows back through this channel and through control nozzle 47 into region 42, whilst only air is aspirated through the feedback channel 48 and control nozzle 46 into region 42 on the left side of the jet. Since volumetric flow of air due to the aspiration through control nozzle 46 is much greater than the volumetric flow of the air-water mixture through control nozzle 47, the right side of the jet in region 42 experiences a lower pressure than the left side; this in turn causes the jet to attach to the right wall of region 42 so that the jet is diverted to the left outlet passage 51.

The above operation is aided and enhanced by a small portion of the jet in region 42 being peeled off and returned into region 42 by the cusp at the exit throat 42. The returned jet portion circulates within region 42 in clockwise direction in the above example, thus providing a positive feedback to hold the jet to the right wall. This feedback flow also effects a closure of the region 42 exit against external air which might otherwise enter from the only partially fluid-filled region 44 into region 42 and which might interfere with the correct and desired oscillator operation.

The jet diversion to the left outlet passage 51 causes a portion of the air-water jet to enter feedback passage 48 because of aspiration of that passage by the jet. The fluid flowing through feedback channel 48 and control nozzle 46 causes a lower pressure on the left side of the jet in region 42 than on the right side, which by now has aspirated all fluid out of the feedback line 49 via control nozzle 47 and which aspirates air from the right outlet passage 52. This condition of pressure reversal on the two sides of the jet in region 42 again causes the jet to switch to the left wall of the region 42, aided by feedback in this region so that the jet is now diverted to the right outlet passage 52.

In the above manner, the jet is caused to switch back and forth between the left and right outlet passages 51 and 52 at a rate determined by the time delay in the circuitry, which is proportional to the fluid flow velocity in the channels, whereby the power stream flow velocity provides the forward time delay from nozzle 41 to region 44 and the feedback flow velocity provides the feedback time delay from region 44 to control nozzles 46, 47.

The major advantage over the prior art of using a single, two-outlet fluid oscillator for the purpose described is that only one sprayer unit, rather than two, is required. This reduces the hosing requirement and the installation difficulty.

It should be noted, too, that the fluidic oscillator of FIG. 6 is only one of the numerous types of fluidic oscillators useful for application as two-outlet sprayer 7 in FIG. 5. Virtually any two-outlet oscillator can be so employed.

In addition to fluidic (i.e. no moving parts) oscillators, other oscillator arrangements may be employed for the embodiments of FIGS. 1, 4 and 5. For example, reference is made to FIG. 7 wherein there is illustrated a portion of a rigid stem member 110 having a central fluid-conducting bore 111 defined therein. The bore terminates at the outlet end of the stem where it receives a flexible tube 112. One end of the tube is bonded or otherwise secured in the bore 111; the other end of the tube is freely suspended. Water flow through the bore 111 and tube 112 causes the outlet end of the tube to react by whipping back and forth. If this whipping motion is constrained to a single plane, the tube sweeps back and forth at a frequency determined by the water pressure.

In FIG. 8, the sweeping arrangement of FIG. 7 is illustrated as part of a nozzle 120. Specifically flexible tube 121 is fixedly mounted at one end 122 where it receives water under pressure. The other end of the tube is suspended. A bottom wall 123 and top wall (not shown) constrain the tube so that it moves only in a plane parallel to these two walls. Water issued by tube 121 is in the form of a jet which respectively sweeps back and forth as the tube shifts back and forth within head 120. As illustrated, nozzle 120 is suitable as a sprayer unit for the embodiment of FIGS. 1 and 4. To modify nozzle 120 for use in the FIG. 5 embodiment, one would merely extend the downstream length of the unit and add a flow divider so that two discrete, appropriately directed outlet passages are formed.

Still another sweep arrangement is illustrated in FIG. 9 wherein a vibrating reed type oscillator is incorporated in a nozzle 130. The oscillator includes a generally heart-shaped interaction region 131 which is open at its pointed or downstream end to provide an outlet 135 for a water jet. An outlet region 136 is located downstream of outlet 135 and is bounded by diverting outlet walls 137, 138. Inlets 132, 133 for pressurized water are located in respective lobes of heart-shaped chamber 131 and are arranged to receive pressurized water from a supply conduit (not shown). Interaction region 131 is formed as a channel in one plate of nozzle 130 and is covered and sealed by another plate (not shown).

A vibratable reed 134 extends longitudinally through chamber 131 and is fixed to the upstream end of the chamber. The other end of reed 134 is freely suspended and extends into outlet region 136. The width of the reed (i.e.—the dimension perpendicular to the plane of the drawing) is just slightly smaller than the depth of the channel from which the interaction region 131 is formed. The reed thus divides interaction region 131 into two sub-chambers 139, 140.

In operation, the reed 134 is alternately driven from side to side in the interaction by the alternating and oppositely-phased build up and relaxation of pressure on both sides of the reed. For example, in the position of the reed shown in solid line of FIG. 9, wherein the reed is against outlet wall 138, sub-chamber 139 is sealed off from outlet 135 by the reed. Consequencly the pressure builds up within sub-chamber 139. Sub-chamber 140 on the other hand has complete access to outlet 135 so that outflow from sub-chamber 140 avoids pressure build-up therein. The differential pressure between the two sub-chambers deflects the reed. Oscillation of the reed continues in this manner.

Outflow from the interaction region is in the form of a water jet directed in accordance with the position of the reed. For example, when the reed is against outlet wall 138, outflow from sub-chamber 140 is directed by the reed and by the sub-chamber sidewall to flow along the reed. As the reed begins deflecting toward outlet wall 137, flow from sub-chamber 140 remains directed along the reed, the directivity being aided by the boundary layer attachment or Coanda effect along the reed. In addition, as the reed moves from outlet wall 138, outflow begins and gradually increases from sub-chamber 139. This outflow is also guided by the reed and by the curvature of the sidewall in sub-chamber 139. The individual jets from the two sub-chambers merge just downstream of the termination of reed 134 due to the low pressure region created at the reed tip by the aspiration action of the flowing streams. The merging of the two streams forms a single jet which is thus swept by the reed as it oscillates back and forth. Depending upon the material and dimensions of the reed and upon the pressure of the water, high frequencies may be readily achieved.

The nozzle 130 of FIG. 9 is appropriate for use as the sweeping spray unit in the embodiments of FIGS. 1 and 4. This nozzle can be modified, as shown in FIG. 10, by merely adding a flow divider 141 in outlet region 136 to define two discrete outlet passages 142 and 143. This oscillator may be employed in the embodiment of FIG. 5.

In its broadest contexts, the invention as described contemplates a windshield washer employing a sweeping jet, no matter how it is swept. In a narrower concept the invention contemplates the use of a fluidic oscillator as a windshield washer, whether the outflow from the oscillator is a sweeping jet or alternately directed liquid slugs.

It should be noted that where two oscillators are as in the FIG. 1 embodiment, both oscillators may be constructed as part of a single structure.

It should also be noted that, although the invention has been described in terms of washing windshields, it is useful for other windows on a vehicle where a wiper is employed. For example, it is common on some vehicles, particularly station wagons, to employ a washer-wiper arrangement on the rear window of the vehicle.

It must once again be stressed that the washer of the present invention is employed in conjunction with a wiper blade to efficiently wet the window to be wiped.

While I have described and illustrated specific embodiments of my invention, it will be clear that variations of the details of construction which are specifically illustrated and described may be resorted to without departing from the true spirit and scope of the invention as defined in the appended claims.

I claim:

1. A vehicle window washer for use in conjunction with one or more wiper blades arranged to wipe a window, said washer comprising:
    a reservoir of wash liquid;
    sprayer means; and
    means for selectively delivering wash liquid under pressure from said reservoir to said sprayer means;
    wherein said sprayer means comprises:
        a body member;
        an inlet defined in said body member for receiving said wash liquid under pressure;
        jet-defining means within said body member responsive to the received liquid for forming a liquid jet;
        an outlet opening defined in said body member for issuing said jet exteriorly of said body member and onto said window, said outlet opening being elongated in at least one dimension transverse to the flow direction of said jet therethrough; and
        jet sweeping means located within said body member and operated solely by the pressure of said received liquid for breaking said issued jet up into droplets by repetitively sweeping said jet in said one dimension to cause said droplets to be dispersed onto said window.

2. The washer according to claim 1 wherein said jet sweeping means is a fluidic oscillator having no moving parts.

3. The washer according to claim 1 wherein said jet sweeping means is an oscillator comprising vibratory means responsive to said received wash liquid under pressure to oscillatorily sweep said jet back and forth in said one dimension.

4. The washer according to claim 1 wherein said window is a windshield, wherein said body member is mounted substantially along a longitudinal center line of a vehicle, forward of said windshield, with said outlet opening directed rearwardly toward said windshield.

5. The combination according to claim 4 further comprising a second of said windshield washers, likewise mounted substantially along the longitudinal center line of said vehicle, the outlet openings of said two windshield washers being oriented such that the sprays from each strikes said windshield at different heights.

6. The combination according to claim 1 wherein said window is a windshield, wherein said body member is mounted to one side of center of said windshield, and further comprising a second of said windshield washers mounted on the opposite side of center of said windshield.

7. The combination according to claim 6 wherein said two windshield washers are relatively positioned to permit overlap of their respective spray patterns on said windshield.

8. A vehicle window washer for use in conjunction with one or more wiper blades arranged to wipe a window, said washer comprising:
    a reservoir of wash liquid;
    sprayer means; and
    means for selectively delivering wash liquid under pressure from said reservoir to said sprayer means;

wherein said sprayer means comprises:
a body member;
an inlet defined in said body member for receiving said wash liquid under pressure;
jet-defining means within said body member responsive to the received liquid for forming a liquid jet;
an outlet opening defined in said body member for issuing said jet exteriorly of said body member and onto said window, said outlet opening being elongated in at least one dimension transverse to the flow direction of said jet therethrough; and
jet sweeping means located within said body member and operated solely by the pressure of said received liquid for repetitively sweeping said jet in said one dimension;
wherein said jet-defining means is a power nozzle and said jet-sweeping means is a fluidic oscillator, said oscillator comprising:
an interaction region having an upstream end, a downstream end and left and right sidewalls which first diverge from said upstream end and then converge to define an exit throat at said downstream end, said power nozzle being arranged to issue said jet onto said interaction region at said upstream end;
an outlet region located downstream of said exit throat and upstream of said outlet opening and defined between left and right outlet walls which diverge from said exit throat;
left and right control passages extending between said outlet region and the upstream end of said interaction region, said left control passage opening into said interaction region through said left sidewall and into said outlet region through said left outlet wall, said right control passage opening into said interaction region through said right sidewall and into said outlet region through said right outlet wall; and
means for establishing a static pressure at the upstream end of said interaction region which is positive relative to the static pressure in said outlet region such that liquid flows from said interaction region to said outlet region along said outlet walls via said control passages.

9. The method of wetting a vehicle window as part of a window washer and wiper arrangement, said method comprising the steps of:
pressurizing a quantity of wash liquid;
forming a jet of the pressurized wash liquid;
under the sole initiative of the pressure of said liquid, repetitively sweeping said jet in at least one dimension transverse to the flow direction of said jet in an oscillatory manner; and
issuing the repetitively swept jet to cause it to break up into droplets which successively impinge upon said window in a generally fan-shaped pattern.

10. The method according to claim 9 wherein the step of repetitively sweeping comprises oscillatorily sweeping said jet back and forth in said one dimension.

11. The method according to claim 10 wherein the step of repetitively sweeping involves no moving parts.

12. The method according to claim 9 wherein said step of repetitively sweeping comprises the steps of:
sweeping a movable member in response to said pressurized wash liquid; and
variably directing said jet in said one dimension with said sweeping movable member.

13. A vehicle window washer for use in conjunction with one or more wiper blades arranged to wipe a window, said washer comprising:
a reservoir of wash liquid;
sprayer means; and
means for selectively delivering wash liquid under pressure from said reservoir to said sprayer means;
wherein said sprayer means comprises a fluidic oscillator comprising:
a power nozzle for defining a liquid jet from the pressurized wash liquid delivered to said sprayer means;
oscillation means having no moving parts and responsive to said jet for breaking said jet up into droplets oscillating said jet back and forth in a dimension transverse to the flow direction of said jet; and
means for dispersing said droplets onto said window.

14. The washer according to claim 13 wherein said oscillation means comprises:
an interaction region having an upstream end, a downstream end and left and right sidewalls which first diverge from said upstream end and then converge to define an exit throat at said downstream end, said power nozzle being arranged to issue said jet into said interaction region at said upstream end;
an outlet region located downstream of said exit throat and upstream of said outlet opening and defined between left and right outlet walls which diverge from said exit throat; and
left and right control passages extending between said outlet region and the upstream end of said interaction region, said left control passage opening into said interaction region through said left sidewall and into said outlet region through said left outlet wall, said right control passage opening into said interaction region through said right sidewall and into said outlet region through said right outlet wall.

15. The washer according to claim 13 wherein said oscillation means further comprises:
a flow splitter disposed in said outlet region to define left and right outlet passages between the flow splitter and said left and right outlet walls, respectively.

16. The washer according to claim 15 wherein said fluidic oscillator is positioned substantially along the longitudinal center of said vehicle and wherein said left and right outlet passages are oriented to deliver flow therethrough onto respective sides of said window.

17. The washer according to claim 13 wherein said oscillation means includes:
an interaction region having an upstream end, a downstream end, and left and right sidewalls, said power nozzle being arranged to issue said jet into said interaction region at said upstream end;
an outlet region located downstream of said interaction region and defined between left and right outlet walls which diverge from said outlet region;
left and right control passages extending between said outlet region and the upstream end of said interaction region; and
a flow splitter located in said outlet region to define left and right outlet passages between the flow splitter and said left and right outlet walls, respectively.

18. The washer according to claim 17 wherein said fluidic oscillator is positioned substantially along the longitudinal center of said vehicle and wherein said left and right outlet passages are oriented to deliver flow therethrough onto respective sides of said window.

19. A vehicle window washer for use in conjunction with one or more wiper blades arranged to wipe a window, said washer comprising:
   a reservoir of wash liquid;
   sprayer means; and
   means for selectively delivering wash liquid under pressure from said reservoir to said sprayer means;
   wherein said sprayer means comprises a fluidic oscillator comprising:
   a power nozzle for defining a liquid jet from the pressurized wash liquid delivered to said sprayer means;
   oscillation means having no moving parts and responsive to said jet for oscillating said jet back and forth in a dimension transverse to the flow direction of said jet; and
   means for directing the oscillating jet onto said window;
   wherein said oscillation means comprises:
      an interaction region having an upstream end, a downstream end and left and right sidewalls which first diverge from said upstream end and then converge to define an exit throat at said downstream end, said power nozzle being arranged to issue said jet into said interaction region at said upstream end;
      an outlet region located downstream of said exit throat and upstream of said outlet opening and defined between left and right outlet walls which diverge from said exit throat; and
      left and right control passages extending between said outlet region and the upstream end of said interaction region, said left control passage opening into said interaction region through said left sidewall and into said outlet region through said left outlet wall, said right control passage opening into said interaction region through said right sidewall and into said outlet region through said right outlet wall;
   wherein said oscillation means further comprises:
   means for establishing a static pressure at the upstream end of said interaction region which is positive relative to the static pressure in said outlet region such that liquid flows from said interaction region to said outlet region along said outlet walls via said control passages.

20. Apparatus for efficiently distributing wash liquid onto a transparent pane of a vehicle to facilitate cleaning of the pane by one or more wiper blades arranged to wipe a prescribed area of said pane, said apparatus comprising:
   a reservoir of said wash liquid;
   sprayer means for spraying liquid delivered thereto onto said pane in a manner to preclude formation of puddles of said wash liquid on said pane;
   means for selectively delivering said wash liquid under pressure from said reservoir to said sprayer means;
   wherein said sprayer means comprises:
      a body member secured to said vehicle;
      inlet means defined in said body member for admitting said wash liquid under pressure into said body member;
      outlet means defined in said body member for issuing said wash liquid from inside said body member onto said pane; and
      liquid distribution means for distributing a series of individual droplets of said wash liquid over said prescribed area of said pane, said liquid distribution means including means inside said body member for cyclically and continuously redirecting the wash liquid issuing from said outlet means toward different parts of said prescribed area such that successive droplets of said wash liquid impinge upon different spaced locations of said pane.

21. The washer according to claim 20 wherein said flow distribution means is a fluidic oscillator having no moving parts.

22. The washer according to claim 20 wherein said flow distribution means is an oscillator comprising vibratory means responsive to said received wash liquid under pressure to oscillatorily redirect said issuing wash liquid.

23. The method of wetting a transparent pane of a vehicle as part of a washer and wiper arrangement, said method comprising the steps of:
   pressurizing a quantity of wash liquid; and
   under the sole initiative of the pressure of said wash liquid, issuing said pressurized wash liquid onto said pane while repetitively redirecting the issued wash liquid in an oscillatory manner toward different portions of said pane to cause the issued wash liquid to break up into droplets which successively impinge upon said different spaced portions of said pane to thereby avoid the formation of puddles of said wash liquid on said pane.

24. The method according to claim 23 wherein the step of issuing and repetitively redirecting comprises forming a jet of said wash liquid and oscillatorily sweeping said jet back and forth transversely to its nominal flow direction.

* * * * *

REEXAMINATION CERTIFICATE (481st)

United States Patent [19]

Bauer

[11] B1 4,157,161

[45] Certificate Issued Apr. 8, 1986

[54] WINDSHIELD WASHER

[75] Inventor: Peter Bauer, Germantown, Md.

[73] Assignee: Bowles Fluidics Corporation, Silver Spring, Md.

Reexamination Request:
No. 90/000,066, Sep. 9, 1981

Reexamination Certificate for:
Patent No.: 4,157,161
Issued: Jun. 5, 1979
Appl. No.: 618,252
Filed: Sep. 30, 1985

[51] Int. Cl.⁴ .................... B05B 1/08; B60S 1/46
[52] U.S. Cl. .................... 239/11; 137/830; 137/835; 239/284 R

[56] References Cited

U.S. PATENT DOCUMENTS

| | | | |
|---|---|---|---|
| 2,114,558 | 4/1938 | Dismukes . | |
| 2,417,222 | 3/1947 | Stine | 239/229 |
| 2,758,874 | 8/1956 | Snyder | 239/229 |
| 2,835,916 | 5/1958 | Mittag et al. | |
| 3,008,170 | 11/1961 | Marks . | |
| 3,089,204 | 5/1963 | Fingeroot et al. | |
| 3,199,787 | 8/1965 | Oishei et al. | 239/284 |
| 3,213,493 | 10/1965 | Chichester | 239/284 X |
| 3,403,859 | 10/1968 | Daansen | 239/284 A |
| 3,423,025 | 1/1969 | Rodger | 239/284 R |
| 3,423,026 | 1/1969 | Carpenter | 239/284 R |
| 3,428,992 | 2/1969 | Di Giorgio . | |
| 3,432,102 | 3/1969 | Turner et al. | 137/835 X |
| 3,458,888 | 8/1969 | Carpenter | 15/250.04 |
| 3,507,275 | 4/1970 | Walker | 128/DIG. 10 X |
| 3,552,415 | 1/1971 | Small | 137/835 |
| 3,563,462 | 2/1971 | Bauer | 137/835 |
| 3,754,576 | 8/1973 | Zetterström et al. | 137/829 |
| 3,790,083 | 2/1974 | Redifer | 239/284 A |
| 3,793,666 | 2/1974 | Wurth | 15/250.04 |
| 3,793,670 | 2/1974 | Riester et al. | 15/250.04 |
| 3,827,101 | 8/1974 | Wubbe | 15/250.04 |
| 3,913,167 | 10/1975 | Frigon | 15/250.04 |
| 3,940,068 | 2/1976 | Mohnach et al. | 239/284 R |
| 3,973,558 | 8/1976 | Stouffer et al. | 128/66 |
| 3,979,068 | 9/1976 | Applebaum | 239/284 R |
| 4,044,953 | 8/1977 | Vogel | 239/229 |
| 4,052,002 | 10/1977 | Stouffer et al. | 239/4 |
| 4,151,955 | 5/1979 | Stouffer | 239/11 |
| 4,210,283 | 7/1980 | Stouffer et al. | 239/11 |
| 4,223,841 | 9/1980 | Schaller et al. | 239/284 A |
| 4,231,519 | 11/1980 | Bauer | 239/102 |
| 4,250,799 | 2/1981 | Stouffer | 239/284 R |

FOREIGN PATENT DOCUMENTS

1655022  3/1971  Fed. Rep. of Germany .
2313980  9/1974  Fed. Rep. of Germany .

*Primary Examiner*—Andres Kashnikow

[57] ABSTRACT

A windshield washer comprises a nozzle in which a liquid jet is formed and repetitively transversely swept before egressing from the nozzle body. The swept jet breaks up into liquid droplets which impinge upon a wide area of a windshield. In a preferred embodiment the nozzle is an oscillator, preferably a fluidic oscillator, in which the jet is swept oscillatorily between two extreme positions. In still another form of the invention discrete slugs of liquid are alternately issued in at least two directions from a common nozzle body.

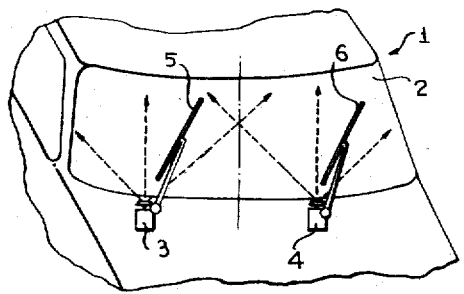

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 1, line 2:

*RELATED APPLICATION*

*Some of the subject matter of this application is disclosed in the copending application of Ronald D. Stouffer and myself as joint inventors, Ser. No. 510,701, filed Sept. 30, 1974, entitled Swept Jet Oral Irrigator now U.S. Pat. No. 3,973,558.*

AS A RESULT OF REEXAMINATION, IT HAS BEEN DETERMINED THAT:

The patentability of claims 13, 15 and 16 is confirmed.

Claims 1, 3, 8-10, 12, 14, 17-20 and 22-24 are cancelled.

Claims 2, 4, 6, 11 and 21 are determined to be patentable as amended.

Claims 5 and 7, dependent on an amended claim, are determined to be patentable.

New claims 25-34 are added and determined to be patentable.

2. [The washer according to claim 1] *A vehicle window washer for use in conjunction with one or more wiper blades arranged to wipe a window, said washer comprising:*
 a reservoir of wash liquid;
 sprayer means; and
 means for selectively delivering wash liquid under pressure from said reservoir to said sprayer means;
 wherein said sprayer means comprises:
 a body member;
 an inlet defined in said body member for receiving said wash liquid under pressure;
 jet-defining means within said body member responsive to the received liquid for forming a liquid jet;
 an outlet opening defined in said body member for issuing said jet exteriorly of said body member and onto said window, said outlet opening being elongated in at least one dimension transverse to the flow direction of said jet therethrough; and
 jet sweeping means located within said body member and operated solely by the pressure of said received liquid for breaking said issued jet up into droplets by repetitively sweeping said jet in said one dimension to cause said droplets to be dispersed onto said window, wherein said jet sweeping means is a fluidic oscillator having no moving parts.

4. The washer according to claim [1] *2* wherein said window is a windshield, wherein said body member is mounted substantially along a longitudinal center line of a vehicle, forward of said windshield, with said outlet opening directed rearwardly toward said windshield.

6. The combination according to claim [1] *2* wherein said window is a windshield, wherein said body member is mounted to one side of center of said windshield, and further comprising a second of said windshield washers mounted on the opposite side of center of said windshield.

11. The method [according to claim 10] *of wetting a vehicle window as part of a window washer and wiper arrangement, said method comprising the steps of:*
 *pressurizing a quantity of wash liquid;*
 *forming a jet of the pressurized wash liquid;*
 *under the sole initiative of the pressure of said liquid repetitively sweeping said jet in at least one dimension transverse to the flow direction of said jet in an oscillatory manner; and*
 *issuing the repetitively swept jet to cause it to break up into droplets which successively impinge upon said window in a generally fan-shaped pattern,*
 wherein the step of repetitively sweeping comprises oscillatory sweeping said jet back and forth in said one dimension, and
 wherein the step of repetitively sweeping involves no moving parts.

21. [The washer according to claim 20] *Apparatus for efficiently distributing wash liquid onto a transparent pane of a vehicle to facilitate cleaning of the pane by one or more wiper blades arranged to wipe a prescribed area of said pane, said apparatus comprising:*
 *a reservoir of said wash liquid,*
 *sprayer means for spraying liquid delivered thereto onto said pane in a manner to preclude formation of puddles of said wash liquid on said pane;*
 *means for selectively delivering said wash liquid under pressure from said reservoir to said sprayer means;*
 *wherein said sprayer means comprises:*
 *a body member secured to said vehicle;*
 *inlet means defined in said body member for admitting said wash liquid under pressure into said body member;*
 *outlet means defined in said body member for issuing said wash liquid from inside said body member onto said pane, and*
 *liquid flow distribution means for distributing a series of individual droplets of said wash liquid over said prescribed area of said pane, said liquid distribution means including means inside said body member for cyclically and continuously redirecting the wash liquid issuing from said outlet means toward different parts of said prescribed area such that successive droplets of said wash liquid impinge upon different spaced locations of said pane, and*
 wherein said flow distribution means is a fluidic oscillator having no moving parts.

25. *In a vehicle window washer as defined in claim 13:*
 *said oscillation means having means for producing a swept jet of liquid of a size, fan angle and oscillatory frequency to produce drops of liquid in a desired fan angle and a size sufficient to carry to the window in a desired pattern at high and low speeds of the vehicle in the presence of wind currents and further generally to prevent the formation of puddles on the window in the interval between passage of the wiper blades.*

26. *In a vehicle window washer as defined in claim 2:*

*said jet sweeping means being of such size as to produce droplets having a desired pattern on said window, and said droplets being of such a size as to wet a desired area of said window at low and high speeds in the presence of varying wind currents without producing appreciable puddling between passes of the wiper blades.*

*27. In the method of claim 11:*

*said step of repetitively sweeping said jet employing fluidic oscillation and comprising:*

*issuing the repetitively swept jet of a cross-sectional area to cause it to break up into droplets of a size and directions to cause the drops to impinge upon the window in a generally fan-shaped pattern across at least the area of desired view through the window at high and low speeds of the vehicle in the presence of varying wind currents without producing appreciable puddling between passes of the wipers.*

*28. The method according to claim 27 wherein the drop size distribution is repetitive between patterns.*

*29. A vehicle window washer as defined in claim 13 in which the vehicle is of a type that normally travels on highways at speeds comparable to the speeds traveled by automobiles and wherein said window is a front windshield, whereby there are high wind speeds immediately in front of said windshield at high vehicle speeds,*

*said oscillation means projecting said sweeping jet onto said windshield at both low and high vehicle speeds without the formation of puddles.*

*30. A vehicle window washer as defined in claim 13 in which said oscillation means comprises means for producing a desired spray pattern on said window.*

*31. The method of claim 11 comprising performing the step of sweeping said jet with a fluidic oscillator for producing a desired spray pattern.*

*32. The method of claim 11 in which the method is applied to a vehicle operable at speeds comparable to those of an automobile, and said jet is projected onto said window in said fan shaped pattern without puddling at both low and high vehicle speeds.*

*33. The method of claim 32 comprising performing the step of sweeping said jet with a fluidic oscillator for producing a desired spray pattern.*

*34. Apparatus as defined in claim 21 wherein:*

*said transparent pane is the windshield of a vehicle capable of traveling on highways at speeds comparable to normal automobile highway speeds.*

* * * * *